United States Patent
Sloane (10) Patent No.: US 11,558,277 B2
(45) Date of Patent: Jan. 17, 2023

(54) SYSTEM FOR GENERATING AND SIGNING CRYPTOGRAPHICALLY GENERATED ADDRESSES USING COMPUTING NETWORK TRAFFIC

(71) Applicant: Bank of America Corporation, Charlotte, NC (US)

(72) Inventor: Brandon Sloane, Santa Barbara, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 260 days.

(21) Appl. No.: 16/869,874

(22) Filed: May 8, 2020

(65) Prior Publication Data
US 2021/0351999 A1 Nov. 11, 2021

(51) Int. Cl.
| | |
|---|---|
| H04L 29/06 | (2006.01) |
| H04L 43/10 | (2022.01) |
| H04L 9/30 | (2006.01) |
| H04L 9/40 | (2022.01) |
| H04L 43/12 | (2022.01) |
| H04L 9/32 | (2006.01) |
| H04L 101/659 | (2022.01) |

(52) U.S. Cl.
CPC ............ *H04L 43/10* (2013.01); *H04L 9/30* (2013.01); *H04L 9/3236* (2013.01); *H04L 43/12* (2013.01); *H04L 63/0263* (2013.01); *H04L 63/126* (2013.01); *H04L 2101/659* (2022.05)

(58) Field of Classification Search
CPC ......... H04L 43/10; H04L 9/30; H04L 9/3236; H04L 43/12; H04L 61/6059; H04L 63/0263; H04L 63/126; H04L 61/2007; H04L 9/0643; H04L 9/3247; H04L 43/0876; H04L 2101/659
See application file for complete search history.

(56) References Cited

U.S. PATENT DOCUMENTS 7,624,264 B2 * 11/2009 Aura .................... H04L 63/123
380/231
7,756,976 B2 7/2010 Purser
(Continued)

OTHER PUBLICATIONS

T. Narten, E. Nordmark, W. Simpson,RFC 2461 Neighbor Discovery for IP Version 6 (IPv6) Dec. 1998, The Internet Society , pp. 1-93. (Year: 1998).*

(Continued)

*Primary Examiner* — Malcolm Cribbs
(74) *Attorney, Agent, or Firm* — Moore & Van Allen PLLC; Seongun M. Hong (57) ABSTRACT

A system is provided for generating and signing cryptographically generated addresses ("CGA") using computing network traffic. In particular, the system, as well as any authorized computing systems within the network, may monitor network traffic during a specified time window for designated types of data or information during the time window. Based on monitoring the network traffic, the system may generate a cryptographic hash output of the data or information collected. The hash output may then subsequently be used, in part or whole, as the modifier in a CGA algorithm to generate a CGA. The system may then selective authorize devices which have generated the CGA using the correct modifier.

17 Claims, 2 Drawing Sheets

(56) References Cited

U.S. PATENT DOCUMENTS

| | | | |
|---|---|---|---|
| 7,756,981 B2 | 7/2010 | Shastri et al. | |
| 7,761,916 B2 | 7/2010 | Shear et al. | |
| 7,925,027 B2 | 4/2011 | Kempf et al. | |
| 7,949,876 B2 | 5/2011 | Haddad | |
| 8,000,698 B2 | 8/2011 | Wolman et al. | |
| 8,089,975 B2 | 1/2012 | DuPertuis et al. | |
| 8,266,427 B2 | 9/2012 | Thubert et al. | |
| 8,665,874 B2 | 3/2014 | Czaszar et al. | |
| 8,910,282 B2 | 12/2014 | Somers et al. | |
| 9,137,670 B2 | 9/2015 | Gray et al. | |
| 9,148,401 B2 | 9/2015 | Shen et al. | |
| 9,426,065 B2 | 8/2016 | Niu et al. | |
| 10,129,239 B2 | 11/2018 | Bell et al. | |
| 10,334,445 B2 | 6/2019 | Hooda et al. | |
| 10,454,675 B2 | 10/2019 | Le Saint | |
| 2006/0212560 A1 | 9/2006 | Purser | |
| 2008/0263353 A1* | 10/2008 | Droms | H04L 29/12283 713/153 |
| 2008/0304457 A1* | 12/2008 | Thubert | H04W 12/102 370/338 |
| 2011/0004766 A1* | 1/2011 | Camarillo | G06F 21/33 713/176 |
| 2011/0099370 A1* | 4/2011 | Shen | H04L 61/6059 713/162 |
| 2017/0264600 A1* | 9/2017 | Froelicher | H04L 63/0823 |
| 2018/0359216 A1 | 12/2018 | Hansen | |
| 2019/0394168 A1 | 12/2019 | Hansen | |
| 2020/0145824 A1* | 5/2020 | Jones, Jr | H04B 3/54 |
| 2020/0177638 A1* | 6/2020 | Salman | H04L 63/14 |

OTHER PUBLICATIONS

J. Arkko, J. Kempf, B. Zill, P. Nikander, RFC 3971 SEcure Neighbor Discovery (SEND) 2005, The Internet Society ,pp. 1-56. (Year: 2005).*

T. Aura, Microsoft Research, Cryptographically Generated Addresses (CGA) Mar. 2005,The Internet Society , pp. 1-22. (Year: 2005).*

* cited by examiner

```
┌─────────────────────────────────────────────────────────┐
│  IMPLEMENT ONE OR MORE NETWORK DATA RULES FOR A         │
│                      NETWORK                            │
│                        201                              │
└─────────────────────────────────────────────────────────┘
                            │
                            ▼
┌─────────────────────────────────────────────────────────┐
│  CONTINUOUSLY COLLECT NETWORK DATA BY MONITORING        │
│  NETWORK TRAFFIC ACCORDING TO THE ONE OR MORE NETWORK   │
│                     DATA RULES                          │
│                        202                              │
└─────────────────────────────────────────────────────────┘
                            │
                            ▼
┌─────────────────────────────────────────────────────────┐
│  DETECT THAT A COMPUTING DEVICE ON THE NETWORK HAS      │
│  GENERATED A CRYPTOGRAPHICALLY GENERATED ADDRESS        │
│  ("CGA"), WHEREIN THE CGA COMPRISES A PUBLIC KEY        │
│  ASSOCIATED WITH THE COMPUTING DEVICE                   │
│                        203                              │
└─────────────────────────────────────────────────────────┘
                            │
                            ▼
┌─────────────────────────────────────────────────────────┐
│  BASED ON THE NETWORK DATA AND THE PUBLIC KEY ASSOCIATED│
│  WITH THE COMPUTING DEVICE, COMPUTE A CGA VALIDATION    │
│                       OUTPUT                            │
│                        204                              │
└─────────────────────────────────────────────────────────┘
                            │
                            ▼
┌─────────────────────────────────────────────────────────┐
│  VALIDATE THE CGA OF THE COMPUTING DEVICE USING THE CGA │
│                  VALIDATION OUTPUT                      │
│                        205                              │
└─────────────────────────────────────────────────────────┘
```

FIG. 2

SYSTEM FOR GENERATING AND SIGNING CRYPTOGRAPHICALLY GENERATED ADDRESSES USING COMPUTING NETWORK TRAFFIC

FIELD OF THE INVENTION

The present disclosure embraces a system for generating and signing cryptographically generated addresses using computing network traffic.

BACKGROUND

There is a need for a way to identify unauthorized computing devices within a network environment.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The present disclosure is directed to a system for generating and signing cryptographically generated addresses ("CGA") using computing network traffic. In particular, the system, as well as any authorized computing systems within the network, may monitor network traffic during a specified time window for designated types of data or information during the time window. Based on monitoring the network traffic, the system may generate a cryptographic hash output of the data or information collected. The hash output may then subsequently be used, in part or whole, as the modifier in a CGA algorithm to generate a CGA. The system may then selective authorize devices which have generated the CGA using the correct modifier.

Accordingly, embodiments of the present disclosure provide a system for generating and signing cryptographically generated addresses ("CGA") using computing network traffic. The system may comprise a memory device with computer-readable program code stored thereon; a communication device; and a processing device operatively coupled to the memory device and the communication device. The processing device may be configured to execute the computer-readable program code to implement one or more network data rules for a network; continuously collect network data by monitoring network traffic according to the one or more network data rules; detect that a computing device on the network has generated a CGA associated with the computing device, wherein the CGA comprises a public key associated with the computing device; based on the network data and the public key associated with the computing device, compute a CGA validation output; and validate the CGA associated with the computing device using the CGA validation output.

In some embodiments, validating the CGA associated with the computing device comprises detecting a match between the CGA associated with the computing device and the CGA validation output; and based on detecting the match, determining that the computing device is an authorized device.

In some embodiments, validating the CGA associated with the computing device comprises detecting a mismatch between the CGA associated with the computing device and the CGA validation output; based on detecting the mismatch, determining that the computing device is an unauthorized device; and in response to determining that the computing device is an unauthorized device, executing one or more remediation processes.

In some embodiments, the one or more remediation processes comprises automatically removing and blocking the computing device from the network.

In some embodiments, computing the validation CGA output comprises generating a hash of the network data using a hash algorithm; and using at least a portion of the hash of the network data and the public key associated with the computing device as inputs to a CGA algorithm.

In some embodiments, monitoring network traffic comprises detecting Internet Control Message Protocol version 6 ("ICMPv6") messages, wherein the one or more network data rules comprise a rule to monitor a first type of network traffic over a first time period.

In some embodiments, the first type of network traffic comprises ICMPv6 Type 133 messages, wherein the first time period is 120 seconds.

Embodiments of the present disclosure also provide a computer program product for generating and signing cryptographically generated addresses ("CGA") using computing network traffic. The computer program product may comprise at least one non-transitory computer readable medium having computer-readable program code portions embodied therein, the computer-readable program code portions comprising executable code portions for implementing one or more network data rules for a network; continuously collecting network data by monitoring network traffic according to the one or more network data rules; detecting that a computing device on the network has generated a CGA associated with the computing device, wherein the CGA comprises a public key associated with the computing device; based on the network data and the public key associated with the computing device, computing a CGA validation output; and validating the CGA associated with the computing device using the CGA validation output.

In some embodiments, validating the CGA associated with the computing device comprises detecting a match between the CGA associated with the computing device and the CGA validation output; and based on detecting the match, determining that the computing device is an authorized device.

In some embodiments, validating the CGA associated with the computing device comprises detecting a mismatch between the CGA associated with the computing device and the CGA validation output; based on detecting the mismatch, determining that the computing device is an unauthorized device; and in response to determining that the computing device is an unauthorized device, executing one or more remediation processes.

In some embodiments, the one or more remediation processes comprises automatically removing and blocking the computing device from the network.

In some embodiments, computing the validation CGA output comprises generating a hash of the network data using a hash algorithm; and using at least a portion of the hash of the network data and the public key associated with the computing device as inputs to a CGA algorithm.

In some embodiments, monitoring network traffic comprises detecting Internet Control Message Protocol version 6 ("ICMPv6") messages, wherein the one or more network data rules comprise a rule to monitor a first type of network traffic over a first time period.

Embodiments of the present disclosure also provide a computer-implemented method for generating and signing cryptographically generated addresses ("CGA") using computing network traffic. The computer-implemented method may comprise implementing one or more network data rules for a network; continuously collecting network data by monitoring network traffic according to the one or more network data rules; detecting that a computing device on the network has generated a CGA associated with the computing device, wherein the CGA comprises a public key associated with the computing device; based on the network data and the public key associated with the computing device, computing a CGA validation output; and validating the CGA associated with the computing device using the CGA validation output.

In some embodiments, validating the CGA associated with the computing device comprises detecting a match between the CGA associated with the computing device and the CGA validation output; and based on detecting the match, determining that the computing device is an authorized device.

In some embodiments, validating the CGA associated with the computing device comprises detecting a mismatch between the CGA associated with the computing device and the CGA validation output; based on detecting the mismatch, determining that the computing device is an unauthorized device; and in response to determining that the computing device is an unauthorized device, executing one or more remediation processes.

In some embodiments, the one or more remediation processes comprises automatically removing and blocking the computing device from the network.

In some embodiments, computing the validation CGA output comprises generating a hash of the network data using a hash algorithm; and using at least a portion of the hash of the network data and the public key associated with the computing device as inputs to a CGA algorithm.

In some embodiments, monitoring network traffic comprises detecting Internet Control Message Protocol version 6 ("ICMPv6") messages, wherein the one or more network data rules comprise a rule to monitor a first type of network traffic over a first time period.

In some embodiments, the first type of network traffic comprises ICMPv6 Type 133 messages, wherein the first time period is 120 seconds.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization, a non-profit organization, a government organization, and the like, which may routinely use various types of applications within its enterprise environment to accomplish its organizational objectives.

"Entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, the term "user device" or "mobile device" may refer to mobile phones, personal computing devices, tablet computers, wearable devices, and/or any stationary or portable electronic device capable of receiving and/or storing data therein.

"Resource" as used herein may refer to physical and virtual objects and/or processes used to accomplish the entity's objectives. In this regard, "resource" may refer to applications, data files, computing systems and/or hardware, computing resources (e.g., processing power, memory space, or the like), computing functions, or the like.

"Cryptographic hash function" or "hash algorithm" as used herein may refer to a set of logical and/or mathematical operations or processes that may be executed on a specified segment of data to produce a hash output. Given a specified data input, the hash algorithm may produce a cryptographic hash output value which is a fixed-length character string. Examples of such hash algorithms may include MD5, Secure Hash Algorithm/SHA, or the like. According, "hashing" or "hashed" as used herein may refer to the process of producing a hash output based on a data input into a hash algorithm.

"Public-key cryptography" or "asymmetric cryptography" may refer to a process for data encryption and/or verification by which a pair of asymmetric corresponding cryptographic keys are generated (e.g., a "key pair" comprising a "public key" intended to be distributed and a "private key" intended to be possessed by a single user or device). Data encrypted using a public key may be decrypted only by the possessor of the corresponding private key. Furthermore, data signed with a private key may be validated by the possessor of the corresponding public key to verify the identity of the signer (which may be referred to herein as "digital signing").

"Cryptographically generated address," or "CGA" as used herein may refer to an Internet Protocol Version 6 ("IPv6") address comprising an identifier associated with a computing device on the network (which may be referred to herein as a "host"). The identifier (which may be referred to herein as a "host identifier") may be a hashed public key associated with the host to which an IPv6 address is assigned. In some embodiments, a modifier (e.g., an alphanumeric value) may be used as a parameter for the CGA algorithm in generating the CGA.

Within the context of computing network environments, unauthorized users may attempt to gain access to the network by generating a new CGA using the unauthorized user's public key. Once the unauthorized user has been assigned a valid address by the network, the unauthorized user may be free to communicate with other devices on the network and to execute disruptive processes (e.g., denial of service or "DoS" attempts) and/or compromise sensitive data within the network.

Accordingly, in order to protect against unauthorized users gaining access to the network, the system may require that generated CGA's conform with additional requirements in order to be considered valid. In this regard, the system, in parallel with authorized devices, may continuously monitor and/or log network traffic to gather network data (e.g., messages such as router discovery messages, neighbor discovery messages, redirects, and the like) over a designated period of time. The gathered network data may then be hashed to generate a network hash output based on the network data.

Subsequently, the system may require that CGA's must be generated by using the network hash output as the modifier for the CGA algorithm. In this regard, the system may verify that devices have used to correct network data in generating the device's key pair (e.g., by running the CGA algorithm using the device's public key and the gathered network data). If the CGA computed by the system matches that of the CGA of the device, the system may determine that the device is an authorized device because the CGA was generated using the correct network data.

On the other hand, if there is a mismatch in the CGA values, the system may determine that the device is an unauthorized device and subsequently execute one or more remediation processes with respect to the unauthorized device. For instance, the remediation processes may include blocking/rejecting network traffic coming from the unauthorized device and/or automatically booting the unauthorized device from the network. In other embodiments, the remediation processes may include flagging the device as unauthorized and continuously monitoring and/or tracking the behavior and/or network traffic coming from the unauthorized device.

In some embodiments, the system may change the requirements for the network data collected by the system and/or authorized devices. For instance, the system may change the time window for collecting the network data (e.g., from 120 seconds to 30 seconds) or the type of network data collected (e.g., from router discovery messages to echo reply messages). In such embodiments, the system may periodically synchronize the network data requirements with the various authorized devices on the network. In this way, authorized devices may continue to operate on the network, whereas unauthorized devices may be detected even if such unauthorized devices had previously obtained valid CGA values.

An exemplary embodiment is provided for illustrative purposes. In one embodiment, the system (and authorized computing systems) may monitor network data to continuously collect Type 133 Internet Control Message Protocol version 6 (ICMPv6) messages sent over a 120 second time window. The Type 133 messages may be hashed using a hash algorithm (e.g., SHA-1) to produce a network hash output. A host may then use at least a portion of the network hash output (e.g., the first 128 bits) as a modifier for the CGA algorithm to generate a CGA associated with the host. The CGA, which may comprise a hash of the host's public key, may be digitally signed by the host using the host's private key. Subsequently, upon detecting the host on the network, an authorization server may compute the CGA using the relevant network data and the host's public key to validate the host's CGA as described above.

The system as described herein confers a number of technological advantages over conventional network addressing systems. In particular, by requiring that CGA's are generated with modifiers other than randomly generated values, the system may more effectively detect the presence of rogue devices on the network. In turn, the system may be able to take corrective steps (e.g., booting the rogue device from the network) before unauthorized actions are taken to disrupt the systems and processes within the network environment.

Figure 1:
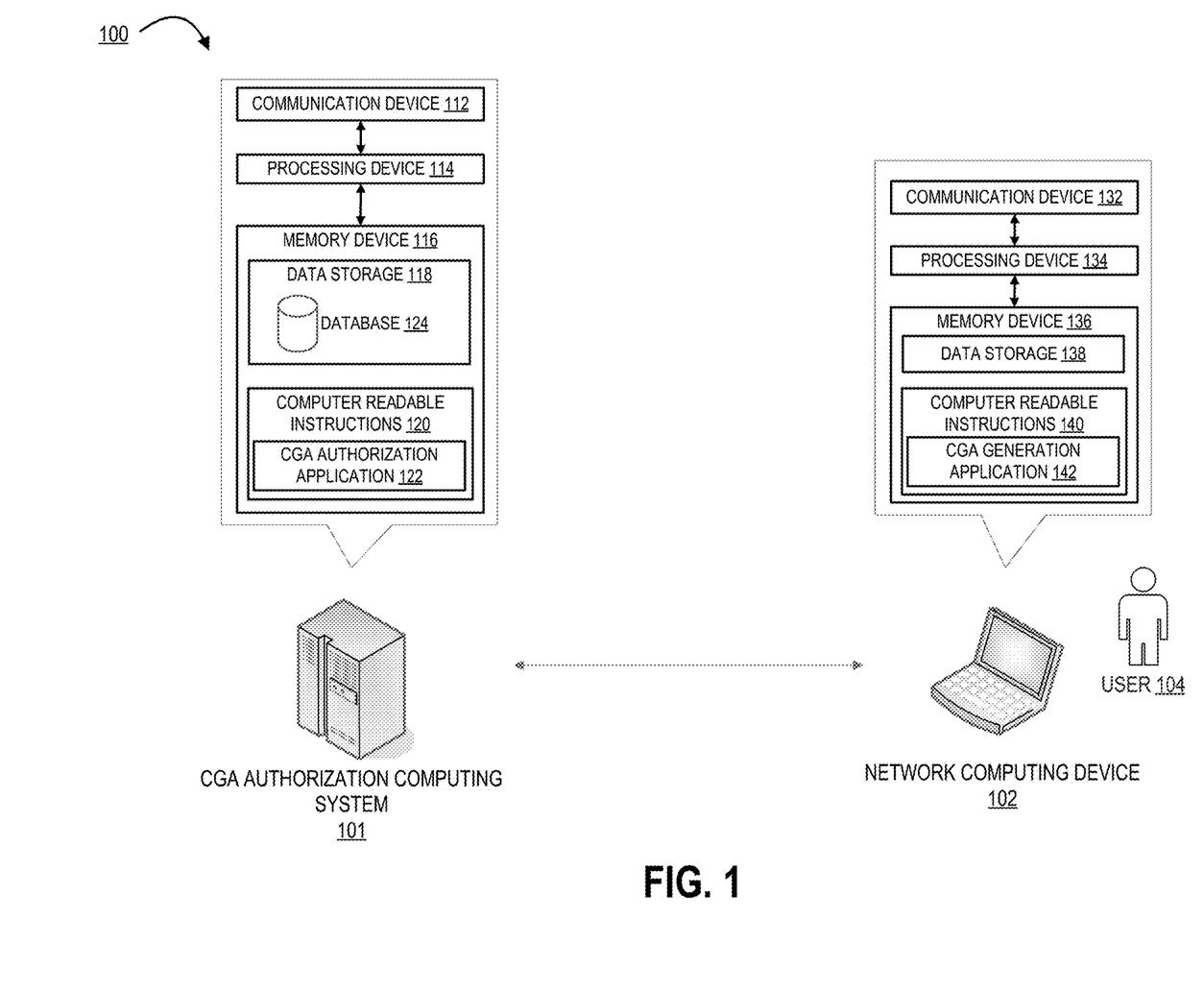
FIG. 1 illustrates an operating environment for the CGA authorization system, in accordance with one embodiment of the present disclosure.

Turning now to the figures, FIG. 1 illustrates an operating environment 100 for the CGA authorization system, in accordance with one embodiment of the present disclosure. In particular, FIG. 1 illustrates a CGA authorization computing system 101 that is operatively coupled, via a network, to a network computing device 102. In such a configuration, the CGA authorization computing system 101 may transmit information to and/or receive information from the network computing device 102. It should be understood that FIG. 1 illustrates only an exemplary embodiment of the operating environment 100, and it will be appreciated that one or more functions of the systems, devices, or servers as depicted in FIG. 1 may be combined into a single system, device, or server. Furthermore, a single system, device, or server as depicted in FIG. 1 may represent multiple systems, devices, or servers. For instance, though the network computing device 102 is depicted as a single unit, the operating environment 100 may comprise multiple network computing devices 102.

The network may be a system specific distributive network receiving and distributing specific network feeds and identifying specific network associated triggers. The network include one or more cellular radio towers, antennae, cell sites, base stations, telephone networks, cloud networks, radio access networks (RAN), WiFi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the CGA authorization computing system 101 may be a networked server, routing device, or other type of computing system within the network environment which performs the CGA authorization processes (e.g., network traffic monitoring, setting network data requirements, performing hash verifications, and the like) as described elsewhere herein. Accordingly, the CGA authorization computing system 101 may comprise a processing device 114 operatively coupled to a communication device 112 and a memory device 116 having data storage 118 and computer readable instructions 120 stored thereon. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 114 is operatively coupled to the communication device 112 and the memory device 116. The processing device 114 uses the communication device 112 to communicate with the network and other devices on the network, such as, but not limited to the network computing device 102. The communication device 112 generally comprises a modem, antennae, WiFi or Ethernet adapter, radio transceiver, or other device for communicating with other devices on the network.

The memory device 116 may have computer-readable instructions 120 stored thereon, which in one embodiment includes the computer-readable instructions 120 of a CGA authorization application 122, which may comprise computer-executable program code which may instruct the processing device 114 to perform certain logic, data processing, and data storing functions of the application to accomplish the entity's objectives. For instance, the CGA authorization application 122 may perform network traffic monitoring and logging, set network data monitoring requirements, perform validation of CGA's, execute remediation processes, and the like.

In some embodiments, the memory device 116 includes data storage 118 for storing data related to the system environment. In this regard, the data storage 118 may comprise a database 124, which may include various types of information regarding target data and/or exfiltration pathways. In some embodiments, the database 124 may comprise a log of network data collected by the CGA authorization computing system 101 by monitoring network traffic. It should be understood that in alternative embodiments, the database 124 may be hosted on a separate computing system (e.g., a database server) instead of being hosted on the CGA authorization computing system 101.

As further illustrated in FIG. 1, the operating environment 100 may further comprise a network computing device 102 in operative communication with the CGA authorization computing system 101. The network computing device 102 may be a computing system that is operated by a user 104, such as an administrator, agent, or employee of the entity. In other embodiments, the user 104 may be a user which is external to the entity, such as an authorized third party user (e.g., a customer or client of the entity) or, in some embodiments, an unauthorized third party user (e.g., a user who attempts to gain unauthorized network access). Accordingly, the network computing device 102 may be a device such as a desktop computer, laptop, IoT device, smartphone, tablet, single-board computer, or the like. The network computing device 102 may comprise a user interface comprising one or more input devices (e.g., a keyboard, keypad, microphone, mouse, tracking device, biometric readers, capacitive sensors, or the like) and/or output devices (e.g., a display such as a monitor, projector, headset, touchscreen, and/or auditory output devices such as speakers, headphones, or the like).

The network computing device 102 may comprise a processing device 134 operatively coupled to a communication device 132 and a memory device 136 having data storage 138 and computer readable instructions 140 stored thereon. In some embodiments (e.g., when the user 104 is a user who has been authorized to access the network), the computer readable instructions 140 may comprise a CGA generation application 142. The CGA generation application 142 may include computer readable program code which may be executed to cause the processing device 134 to monitor network traffic according to the network data requirements set by the CGA authorization computing system 101 and to subsequently generate a CGA for the network computing device 102 based on the network data collected.

The communication devices as described herein may comprise a wireless local area network (WLAN) such as WiFi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the computing systems may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic or other systems that perform various functions of the computing systems. These systems may comprise, for example, electrical circuits, motors, compressors, or any system that enables functioning of the computing systems.

Figure 2:
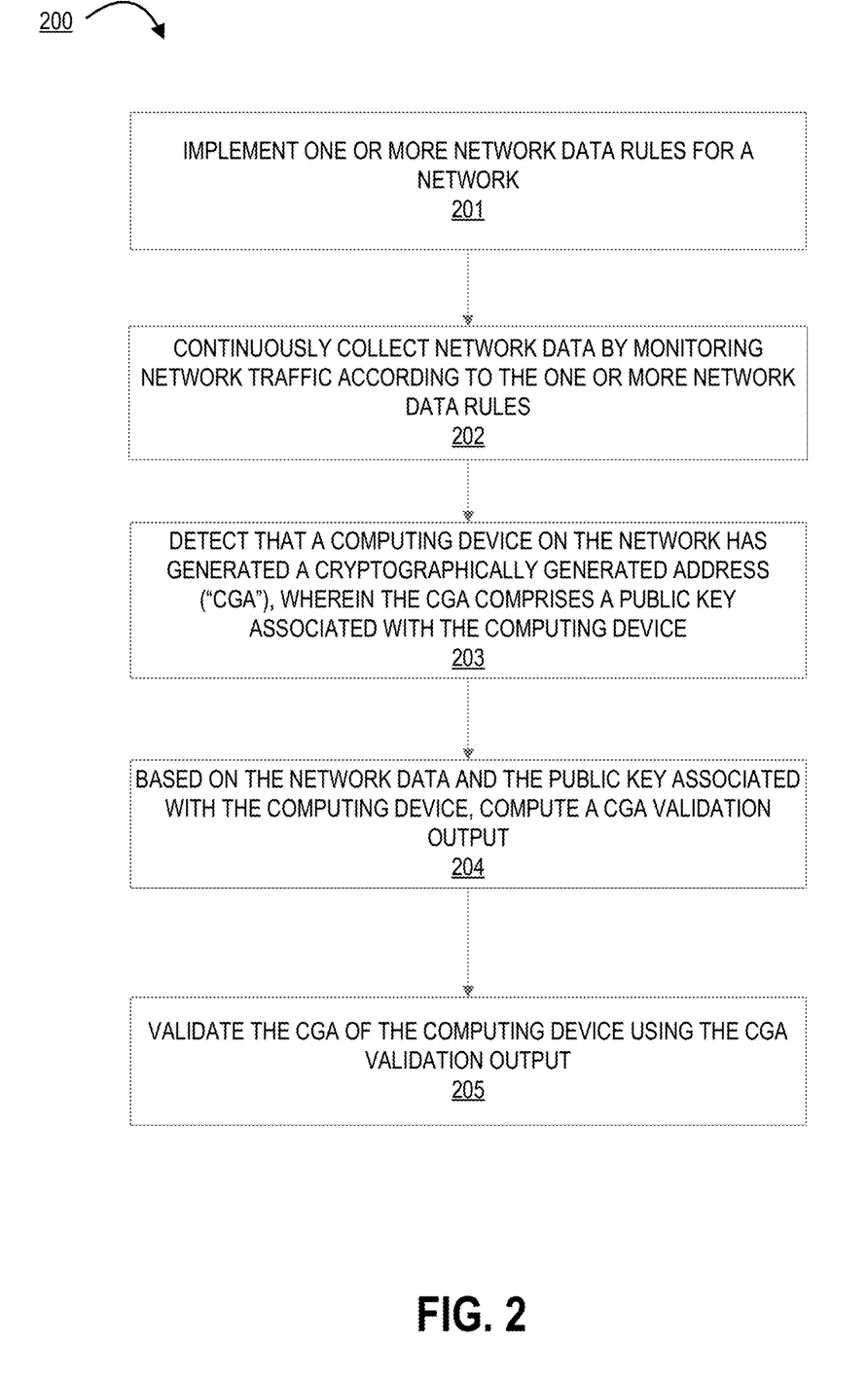
FIG. 2 illustrates a process flow for generating and signing cryptographically generated addresses, in accordance with some embodiments of the present disclosure.

FIG. 2 illustrates a process flow 200 for generating and signing cryptographically generated addresses, in accordance with some embodiments. The process begins at block 201, where the system implements one or more network data rules for a network. The one or more network data rules may be selected by the system to require collection of specific types of network data from the network traffic. In this regard, the system may require that specific types of network packets are monitored (e.g., via the Neighbor Discovery Protocol, or "NDP") over a specific time window, wherein the network packets are then used to generate network addresses (e.g., CGA). As an exemplary embodiment, the one or more network data rules may require that devices on the network collect all of the IPv6 Type 135 messages sent through the network over a period of 60 seconds. In some embodiments, the system may automatically modify the network data rules at regular intervals to increase the security of the CGA generation process. Continuing the above example, after the 60 seconds has elapsed, the network data rules may switch to require collection of IPv6 Type 133 messages for a period of 120 seconds. In this regard, the network data rules may be synchronized across all authorized devices on the network such that authorized devices automatically collect network data according to the correct network data rules at all times.

The process continues to block 202, where the system continuously collects network data by monitoring network traffic according to the one or more network data rules. The system may maintain a continuous log of the network traffic according to the network data rules for each time window. In this way, the system may be able to perform validation for CGA's generated at any point in time. Once the system (and/or the authorized devices) have collected the network data according to the network data rules, the collected network data may be used by each authorized device to generate a CGA associated with the authorized device. In this regard, the authorized device may generate a hash of the network data collected (e.g., using SHA-1) and use at least a portion of the resulting hash as an input (e.g., as the modifier) for the CGA algorithm along with the public key associated with the authorized device.

The process continues to block 203, where the system detects that a computing device on the network has generated a cryptographically generated address ("CGA"), wherein the CGA comprises a public key associated with the computing device. For instance, the system may detect the presence of a device on the network by monitoring messages sent to and/or from the detected device (e.g., ICMPv6 packets). In some embodiments, the system may periodically scan for new devices on the network.

The process continues to block 204, where the system, based on the network data and the public key associated with the computing device, computes a CGA validation output. In generating the CGA validation output, the system may read the log of network data to retrieve the network data and/or network data requirements that relate to the time period in which the CGA of the detected device was generated. The system may then use the network data along with the public key of the detected device (e.g., in hashed form) as inputs into the CGA algorithm to generate the CGA validation output. In this way, the system runs the same computations as those of an authorized device generating a valid CGA.

The process continues to block 205, where the system validates the CGA of the computing device using the CGA validation output. Because the system has run the same computations as those of an authorized device, in order for a CGA to be considered valid, the CGA of the detected device must match the CGA validation output. Accordingly, if the system detects a match between the CGA of the device and the CGA validation output, the system may authorize the device to remain connected to the network. On the other hand, if the system detects a mismatch between the CGA of the device and the CGA validation output, the system may consider the CGA of the device to be invalid, which in turn may cause the system to determine that the device is unauthorized.

In some embodiments, the system may execute one or more remediation processes in response to detecting that the device is unauthorized. For instance, the remediation processes may include automatically removing the unauthorized device from the network and/or blocking the unauthorized device from accessing the network. In other embodiments, the system may allow the device to remain on the network while monitoring and tracking the actions taken by the device and/or limiting the types of network messages that may be sent by the unauthorized device. In this way, the system may add an additional layer of security to the network environment.

Each communication interface described herein generally includes hardware, and, in some instances, software, that enables the computer system, to transport, send, receive, and/or otherwise communicate information to and/or from the communication interface of one or more other systems on the network. For example, the communication interface of the user input system may include a wireless transceiver, modem, server, electrical connection, and/or other electronic device that operatively connects the user input system to another system. The wireless transceiver may include a radio circuit to enable wireless transmission and reception of information.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for generating and signing cryptographically generated addresses ("CGA") using computing network traffic, the system comprising:
    a memory device with computer-readable program code stored thereon;
    a communication device; and
    a processor operatively coupled to the memory device and the communication device, wherein the processor is configured to execute the computer-readable program code to:
        implement one or more network data rules for a network, wherein the one or more network data rules comprise a rule for monitoring network packets over a specified time window;
        continuously collect network data by monitoring network traffic according to the one or more network data rules;
        detect that a computing device on the network has generated a CGA associated with the computing device, wherein the CGA comprises a public key associated with the computing device;
        based on the network data and the public key associated with the computing device, compute a CGA validation output, wherein computing the CGA validation output comprises inputting 1) the network packets monitored over the specified time window; and 2) the public key associated with the computing device into a CGA algorithm to generate the CGA validation output; and
        validate the CGA associated with the computing device using the CGA validation output.

2. The system according to claim 1, wherein validating the CGA associated with the computing device comprises:
    detecting a match between the CGA associated with the computing device and the CGA validation output; and
    based on detecting the match, determining that the computing device is an authorized device.

3. The system according to claim 1, wherein validating the CGA associated with the computing device comprises:
    detecting a mismatch between the CGA associated with the computing device and the CGA validation output;
    based on detecting the mismatch, determining that the computing device is an unauthorized device; and
    in response to determining that the computing device is an unauthorized device, executing one or more remediation processes.

4. The system according to claim 3, wherein the one or more remediation processes comprises automatically removing and blocking the computing device from the network.

5. The system according to claim 1, wherein monitoring network traffic comprises detecting Internet Control Message Protocol version 6 ("ICMPv6") messages, wherein the one or more network data rules comprise a rule to monitor a first type of network traffic over a first time period.

6. The system according to claim 5, wherein the first type of network traffic comprises ICMPv6 Type 133 messages, wherein the first time period is 120 seconds.

7. A computer program product for generating and signing cryptographically generated addresses ("CGA") using computing network traffic, the computer program product comprising at least one non-transitory computer readable medium having computer-readable program code portions embodied therein, the computer-readable program code portions comprising executable code portions for:
implementing one or more network data rules for a network, wherein the one or more network data rules comprise a rule for monitoring network packets over a specified time window;
continuously collecting network data by monitoring network traffic according to the one or more network data rules;
detecting that a computing device on the network has generated a CGA associated with the computing device, wherein the CGA comprises a public key associated with the computing device;
based on the network data and the public key associated with the computing device, computing a CGA validation output, wherein computing the CGA validation output comprises inputting 1) the network packets monitored over the specified time window; and 2) the public key associated with the computing device into a CGA algorithm to generate the CGA validation output; and
validating the CGA associated with the computing device using the CGA validation output.

8. The computer program product according to claim 7, wherein validating the CGA associated with the computing device comprises:
detecting a match between the CGA associated with the computing device and the CGA validation output; and
based on detecting the match, determining that the computing device is an authorized device.

9. The computer program product according to claim 7, wherein validating the CGA associated with the computing device comprises:
detecting a mismatch between the CGA associated with the computing device and the CGA validation output;
based on detecting the mismatch, determining that the computing device is an unauthorized device; and
in response to determining that the computing device is an unauthorized device, executing one or more remediation processes.

10. The computer program product according to claim 9, wherein the one or more remediation processes comprises automatically removing and blocking the computing device from the network.

11. The computer program product according to claim 10, herein monitoring network traffic comprises detecting Internet Control Message Protocol version 6 ("ICMPv6") messages, wherein the one or more network data rules comprise a rule to monitor a first type of network traffic over a first time period.

12. A computer-implemented method for generating and signing cryptographically generated addresses ("CGA") using computing network traffic, wherein the computer-implemented method comprises:
implementing one or more network data rules for a network, wherein the one or more network data rules comprise a rule for monitoring network packets over a specified time window;
continuously collecting network data by monitoring network traffic according to the one or more network data rules;
detecting that a computing device on the network has generated a CGA associated with the computing device, wherein the CGA comprises a public key associated with the computing device;
based on the network data and the public key associated with the computing device, computing a CGA validation output, wherein computing the CGA validation output comprises inputting 1) the network packets monitored over the specified time window; and 2) the public key associated with the computing device into a CGA algorithm to generate the CGA validation output; and
validating the CGA associated with the computing device using the CGA validation output.

13. The computer-implemented method according to claim 12, wherein validating the CGA associated with the computing device comprises:
detecting a match between the CGA associated with the computing device and the CGA validation output; and
based on detecting the match, determining that the computing device is an authorized device.

14. The computer-implemented method according to claim 12, wherein validating the CGA associated with the computing device comprises:
detecting a mismatch between the CGA associated with the computing device and the CGA validation output;
based on detecting the mismatch, determining that the computing device is an unauthorized device; and
in response to determining that the computing device is an unauthorized device, executing one or more remediation processes.

15. The computer-implemented method according to claim 14, wherein the one or more remediation processes comprises automatically removing and blocking the computing device from the network.

16. The computer-implemented method according to claim 12, wherein monitoring network traffic comprises detecting Internet Control Message Protocol version 6 ("ICMPv6") messages, wherein the one or more network data rules comprise a rule to monitor a first type of network traffic over a first time period.

17. The computer-implemented method according to claim 16, wherein the first type of network traffic comprises ICMPv6 Type 133 messages, wherein the first time period is 120 seconds.

* * * * *